Dec. 11, 1951 J. KELLOGG 2,578,073
LUBRICATOR
Filed May 15, 1946 6 Sheets-Sheet 1

Inventor:
Joseph Kellogg
By: Eugene W. Simpson.
Attorney.

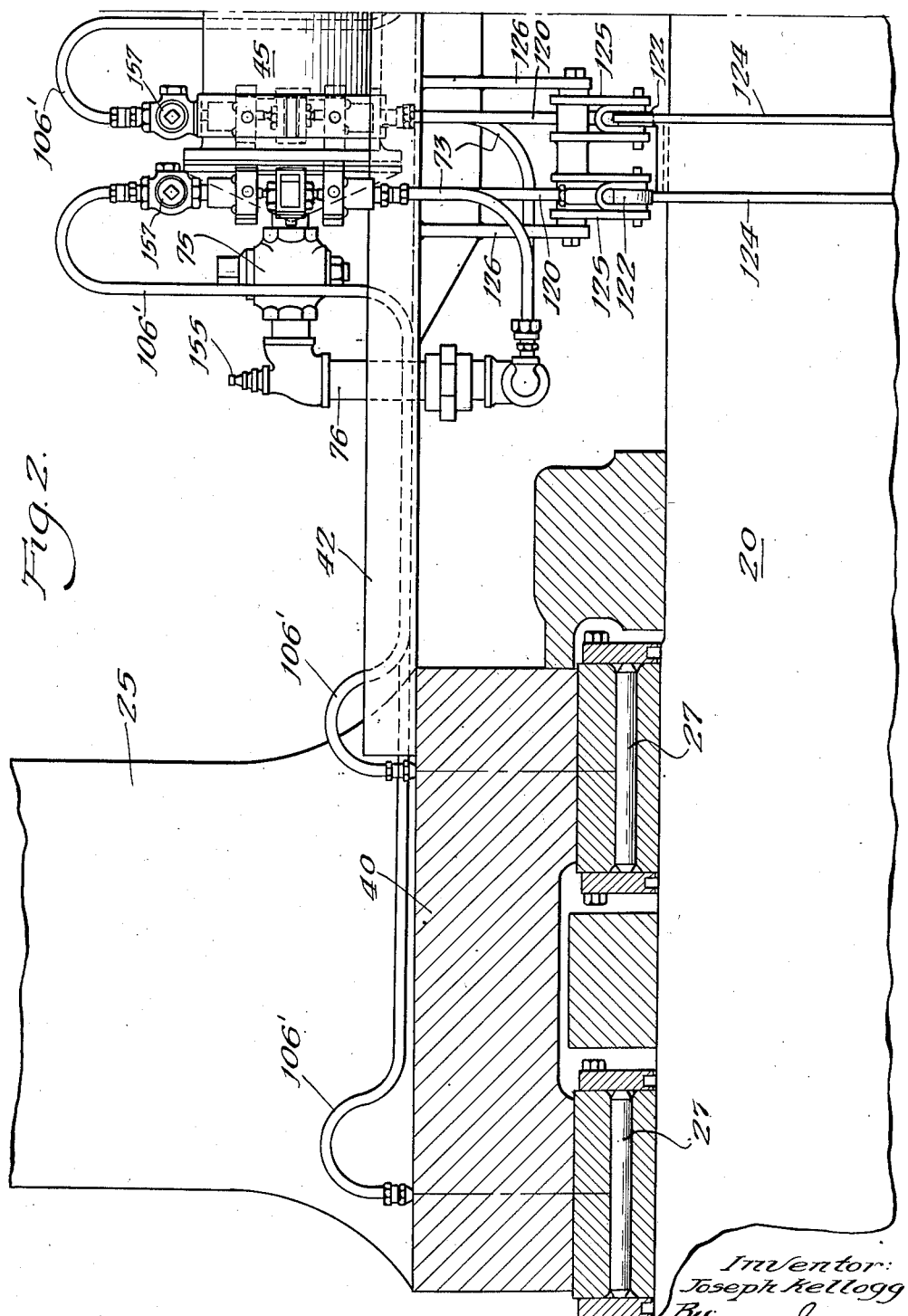

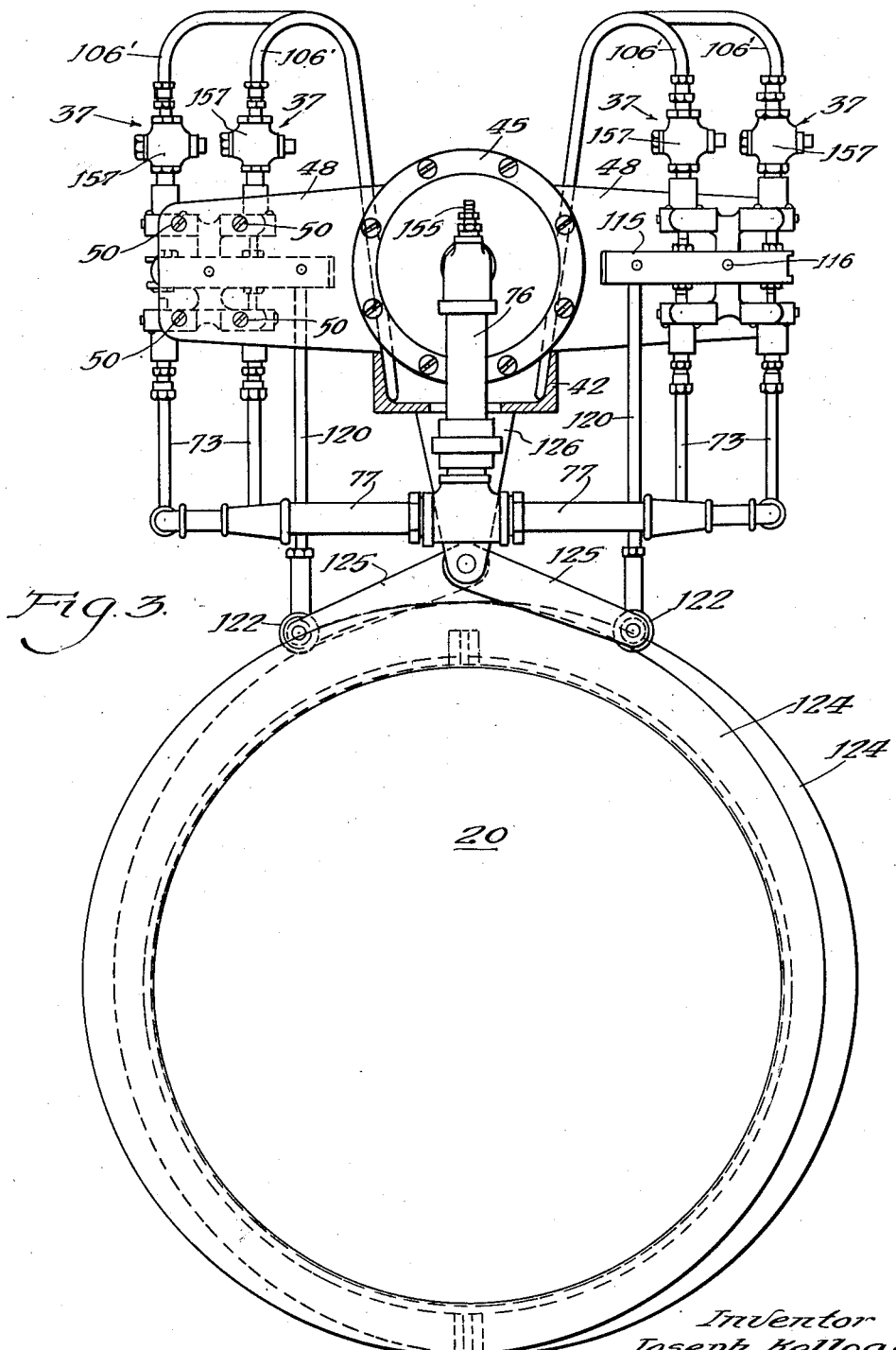

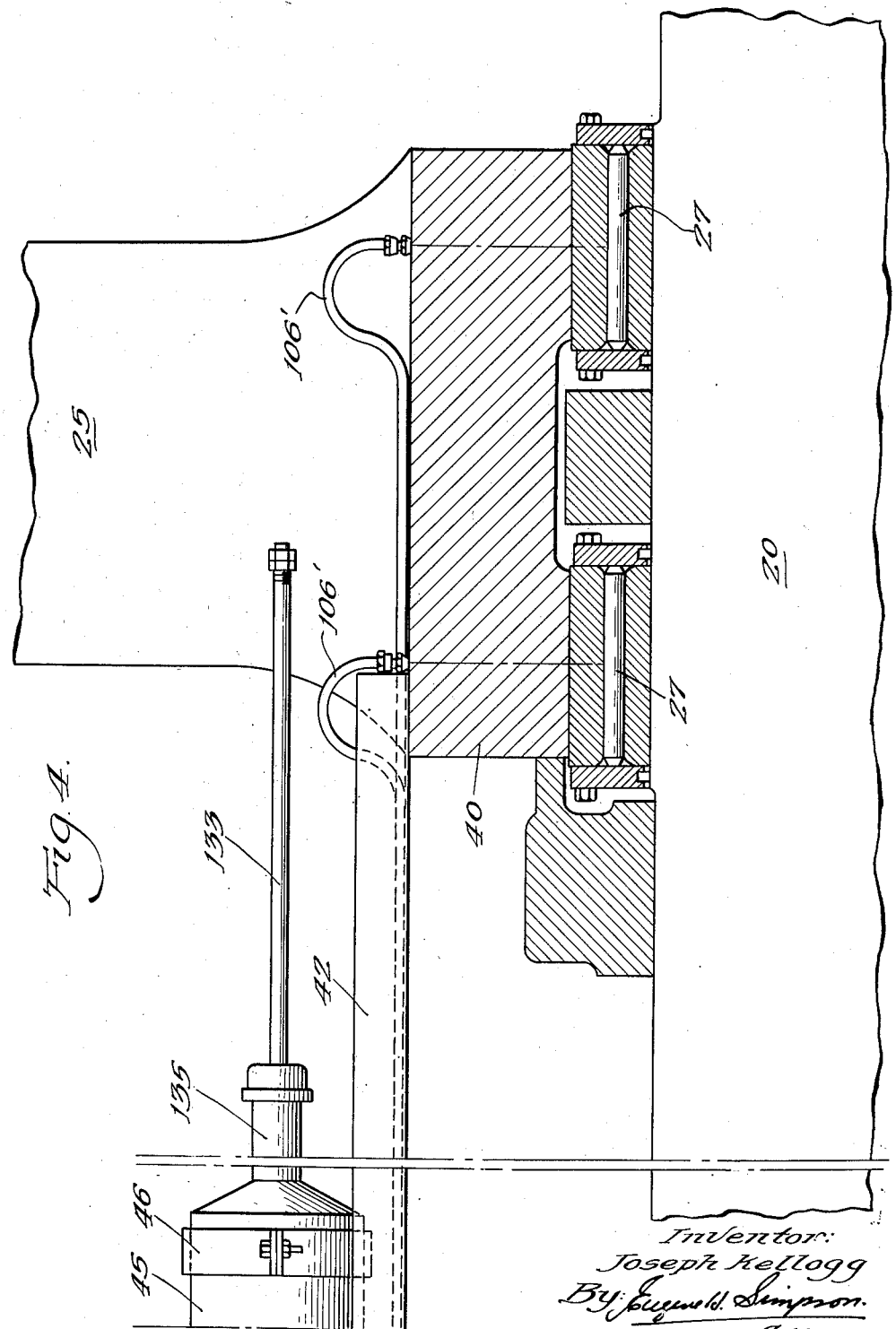

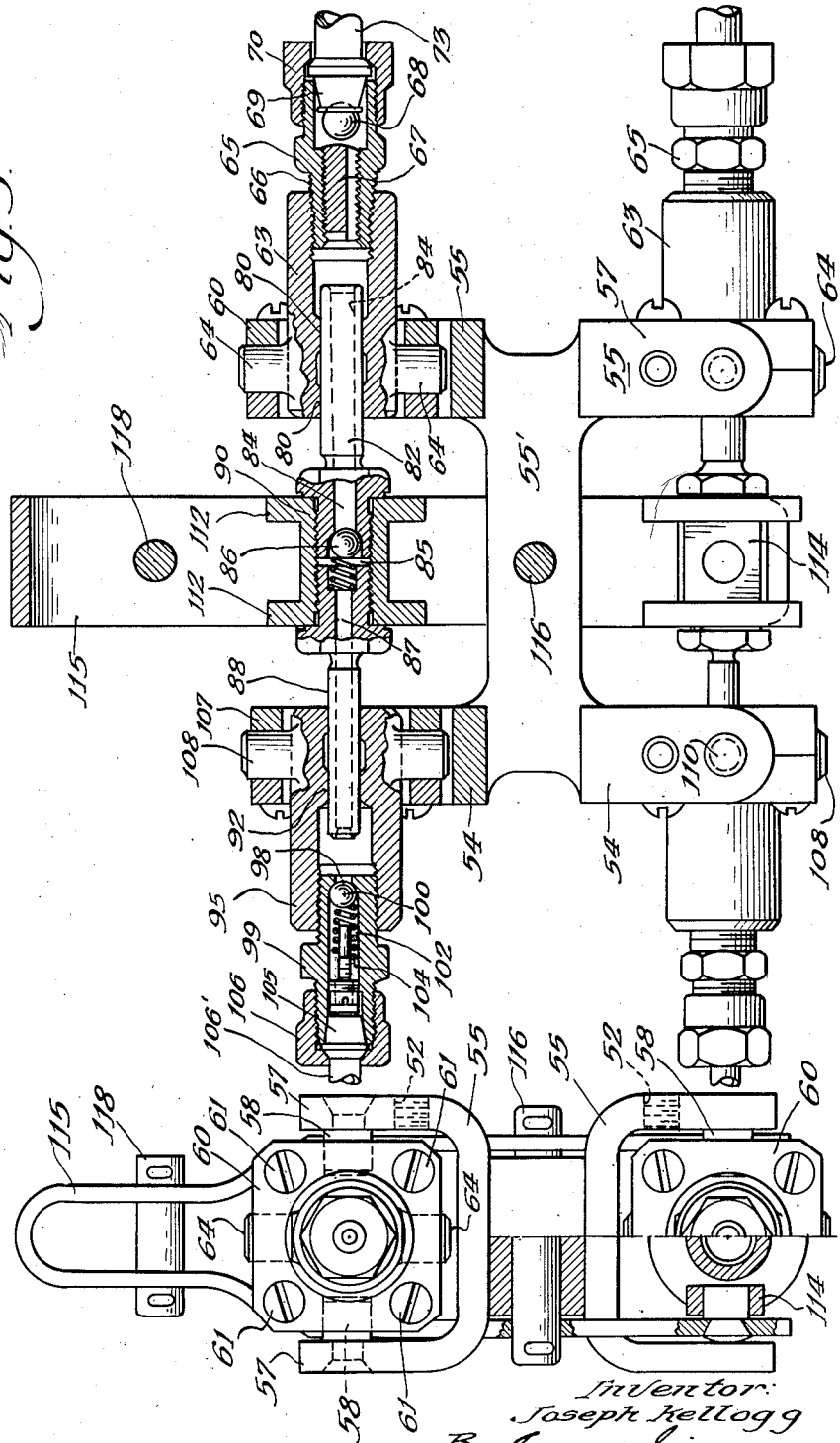

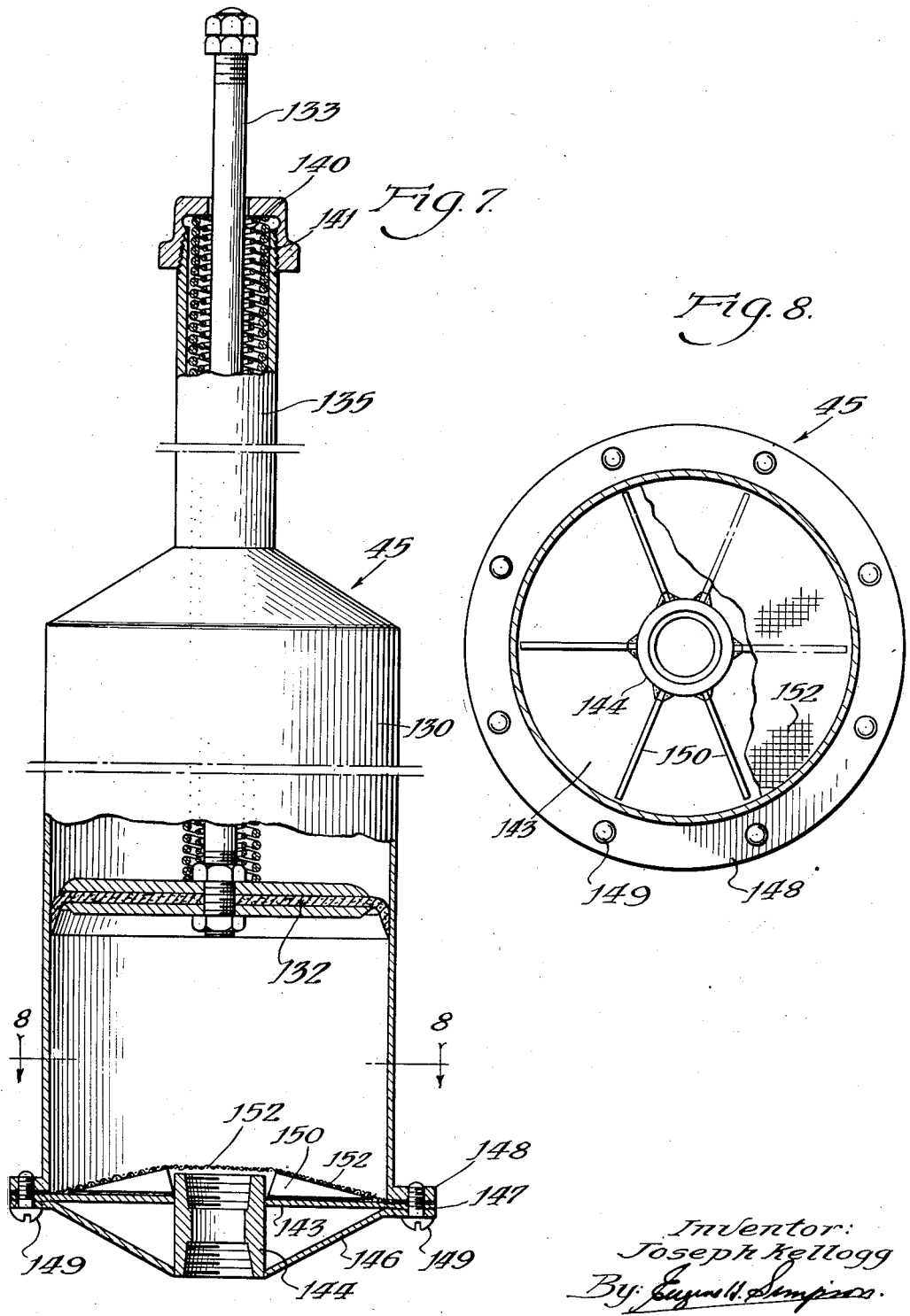

Patented Dec. 11, 1951

2,578,073

UNITED STATES PATENT OFFICE 2,578,073

LUBRICATOR

Joseph Kellogg, Milwaukee, Wis., assignor to Nordberg Manufacturing Co., Milwaukee, Wis.

Application May 15, 1946, Serial No. 669,960

5 Claims. (Cl. 184—6)

This invention relates to bearing lubricators and more particularly to a bearing lubricator for a mine hoist, or the like.

In mine hoists now being made it is common practice to have two hoist drums mounted on a single shaft with one drum keyed to the shaft and the second drum provided with bearings rotatable on the shaft. The second drum is selectively connected to the shaft through a clutch so that it may either rotate with or independently of the shaft. Separate brakes are provided for each drum so that the rotation of either drum may be stopped independently of the other. When the clutch between the second drum and the shaft is disengaged and the second drum held against rotation by its brake, the shaft may be rotated in the bearings of the second or stationary drum while rotating the first drum. At such time it is essential to provide adequate lubrication for the bearings. Lubrication must also be provided when the second drum is rotated while the first drum and shaft remain stationary. However, when the drums rotate simultaneously no lubrication is required as there is no relative movement of the shaft and drum.

One object of the present invention is to provide a lubricating mechanism which will be effective to lubricate the bearings between a fixed drum and a rotatable shaft.

Another object is to provide a lubricator which, during the operation of one mine hoist drum, will become effective to lubricate a bearing on a stationary mine hoist drum on the same shaft.

A further object is to provide a lubricator for a double drum mine hoist which will provide proper lubrication for a drum bearing upon relative movement between the drum and the shaft on which it is mounted.

A further object is to provide a drum lubricator for double drum mine hoists which may be carried by a drum.

A still further object is to provide a lubricator for a double drum mine hoist which will lubricate the bearings upon relative movement of the shaft and a drum.

A still further object is to provide a lubricator for a mine hoist having an improved lubricant pump.

A still further object of the invention is to provide a lubricator for a mine hoist or the like having an improved grease reservoir.

A still further object of the invention is to provide a lubricator for mine hoists or the like, which has a minimum of accurately machined parts.

A still further object is to provide a lubricator for a mine hoist or the like having an improved pump actuator.

Another object is to provide a rotatable bearing lubricator which will have minimum response to centrifugal forces.

Other objects will become apparent upon considering the following specification which when taken in conjunction with the accompanying drawings illustrate a preferred form of the invention.

In the drawings:

Fig. 2 is a slightly enlarged view of the lubricant pump and bearing lubricator;

Fig. 3 is an end view of the lubricant pumps showing the cam actuator;

Fig. 4 is a cross-sectional view through one of the bearings, showing the end of the lubricant reservoir;

Fig. 5 is an elevational view of one set of lubricant pumps, parts thereof being broken away and shown in cross-section to more clearly illustrate other parts;

Fig. 6 is an end view of the lubricant pumps, shown in Fig. 5, with parts thereof being broken away and shown in cross-section to more clearly illustrate other parts;

Fig. 7 is an elevational view partly in cross-section of the lubricant reservoir; and Fig. 8 is a cross-section taken on the line 8—8 of Fig. 7, looking in the direction of the arrows.

Figure 1:
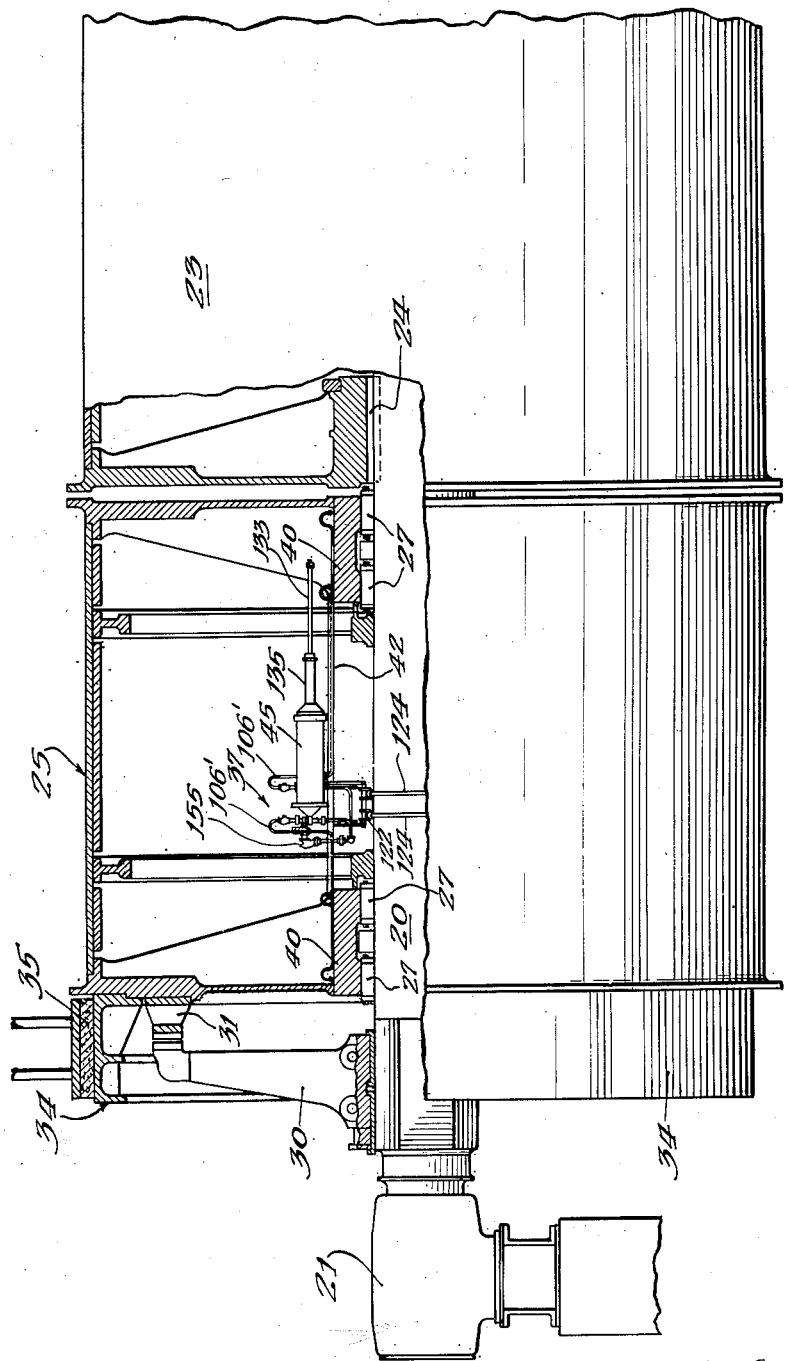
Fig. 1 is an elevational view partly in cross-section of a double drum mine hoist showing the lubricating mechanism, forming the subject matter of the present invention, in place.

Referring to the drawings and particularly to Fig. 1, the mine hoist has a central shaft 20 mounted between a bearing 21 and a similar bearing (not shown) on the opposite end of the shaft. The shaft may be driven by any type of prime mover (not shown). A drum 23 is keyed on the shaft through a key 24 and is adapted to turn therewith. The drum 23 may be stopped and controlled by a brake (not shown). A second drum 25 is journaled on the shaft and may have roller bearings 27—27, or the like, to reduce friction between the shaft and the drum.

A clutch having a driving member 30 is mounted on a hexagonal section of the shaft 20 to turn therewith and engages a driven clutch element 31, fixed on the drum 25 so that when the clutch is engaged the drum 25 will turn with the shaft 20.

Brake drums 34 (only one of which is shown) are formed on each of the drums 23 and 25, which cooperate with brake shoes 35 to control the movement of the drums 23 and 25 individually.

The drum 25 may also be operated independently to lower the skip by gravity by releasing the clutch 30—31 and controlling the downward movement of the skip through the brake 34—35.

Thus there is relative rotation between the shaft 20 and the bearings 27 both when the shaft rotates and the drum 25 remains stationary and when the drum 25 rotates, by releasing both the brake and the clutch, and the shaft 20 remains stationary. At such times it is necessary to provide lubrication for the bearings 27 and to accomplish this a set of lubricant pumps, generally designated 37, in Fig. 1, is mounted from a channel-shaped platform 42 carried between hubs 40 of the drum 25. The lubricant pumps, of which there are four, are shown in detail in Figs. 2, 3, 5 and 6. Referring to Figs. 2 and 3 the hubs 40 support the channel-shaped platform 42 which extends between the hubs on the opposite sides of the drum 25.

A lubricant reservoir 45, which is shown in detail in Figs. 7 and 8 and which will be described more fully below, is mounted on the channel 42 and held thereon by a pair of straps 46 one of which is shown in Fig. 4, the straps being welded or otherwise permanently fixed to the channel 42. The lubricant reservoir 45 supports a pair of wings 48—48, Fig. 3, which extend outwardly at right angles to the reservoir and to the longitudinal axis of the channel 42 to support the four lubricant pumps 37. The lubricant pumps are each connected to the wings 48 by means of bolts 50—50 which pass through the wings 48 and are secured in threaded apertures 52 formed in yokes 54—55 of the pump frames, as seen in Fig. 6.

Referring to Figs. 5 and 6 the pumps are mounted in pairs in a frame comprising a base 55', the opposite ends of which support the yokes 54—54 and 55—55 both yokes 54—54 and 55—55 extending at right angles to the length of the base 55' and at opposite ends thereof.

Yokes 55—55 have parallel arms 57—57 which carry aligned pivots 58—58, the pivots mounting centering blocks 60—60 in the yokes 55—55 for limited rotational movement about the pivots 58. The blocks 60 are split vertically, as seen in Figs. 5 and 6, the halves being held assembled by a plurality of screws 61.

The centering blocks 60 each receive a pump cylinder 63 mounted on pivots 64—64 which are placed at right angles to the axis of the pivots 58—58. The cylinder 63 has limited rotational movement about the pivots 64 which, combined with the limited rotational movement of the block 60 about the pivot 58, gives universal movement to the cylinder 63.

A valve chamber comprising a nipple 65 having external threads 66 screws into the outer end of the cylinder 63. The nipple has interior threads which receive a valve stop 67 adapted to limit the movement of a ball check valve 68 off its seat 69. The valve seat 69 is held on the outer end of the nipple 65 by a collar 70 which holds the valve seat on the end of the nipple.

The amount of grease pumped may be regulated by changing the clearance between the seat 69 and the stop 67, which allows more or less slippage of grease through the valve during closing of the valve, thus varying the quantity pumped.

A grease supply pipe 73 communicates with the valve chamber 65 and conducts grease, as seen in Figs. 2 and 3, from the reservoir 45 through a shut-off cock 75, a vertical pipe 76, a horizontal feeder 77—77, through the pipes 73 and into the low pressure side of the pump 37.

Referring again to Figs. 5 and 6, the inner end of the cylinder 63 is provided with a machined bore 80 which receives a hollow piston 82 having a machined fit in the bore 80. As the piston moves into the cylinder 63 the grease in the cylinder is forced out of the cylinder through a hollow bore 84 in the piston into a central valve chamber 85.

The valve chamber contains a spring loaded ball valve 86. The grease passes from the passageway 84 past the valve 86 and into a passage 87 formed in a hollow piston 88. The valve chamber 85 may be formed by screwing the extended ends of the pistons 82 and 88 into a spool 90 which spool will be described in detail below.

The piston 88 is machined to fit in a bore 92 in a high pressure cylinder 95. The areas of the pistons 82 and 88 may be such that no pumping occurs between the cylinders 63 and 95. This may be accomplished by making the metal cross-sectional area of the piston 82 equal to the total area of the piston 88 so that a mere transfer occurs from the cylinder 63 to the cylinder 95 as the piston 82 moves into the cylinder 63.

If desired the metal cross-sectional area of the piston 82 may be made larger than the total area of the piston 88 in which event the pump becomes a double-acting pump and grease is emitted on both strokes of the pistons.

Grease received through the opening 87 into the cylinder 95, as the piston 82 enters the cylinder 63, is ejected from the cylinder 95 when the piston 88 moves into that cylinder, the grease passing through an opening 98 in a nipple 99. The nipple 99 contains a ball valve 100 mounted on a seat in the interior of the nipple and held on the seat by a spring 102. The spring 102 is mounted on a stem or pin 104 which is mounted on a nipple screwed in the discharge pipe 105 so that the grease may be pumped around the pin and through a central aperture in the nipple. The discharge pipe is held on the outer end of the nipple by a collar 106 which screws thereon and clamps the discharge pipe in place.

The discharge pipes 106' lead from the discharge side of the pumps downwardly into the channel support 42, as seen in Figs. 2, 3 and 4, and conduct grease from the four pumps 37 to the four bearings 27 which support the hubs 40, each pump 37 lubricating one bearing 27.

If desired additional pumps 37 may be used to lubricate other points of friction.

Each cylinder 95 is held in centering blocks 107 by pivots 108 similar to the centering blocks 60 and the pivots 64. The centering blocks 107 are held in the yokes 54 by means of pivots 110 similar to the pivots 58 so that the cylinder 95 has a substantially universal movement similar to the cylinder 63.

The universal movement of the cylinders 63 and 95 provide for automatic alinement of the pistons 82 and 88 and eliminate the accurate machining usually necessary to accomplish this result.

The spool 90 heretofore mentioned has outstanding annular flanges 112—112 which receive actuator blocks 114, Figs. 5 and 6. The actuator blocks are pivotally mounted on a substantially U-shaped actuating lever 115 (Figs. 5 and 6). The actuating lever 115 is pivoted on a fulcrum 116 on the base 55' and is adapted to reciprocate the pistons 82 and 88 as the actuating lever 115 oscillates about the fulcrum 116.

A pin 118 passes through the opposite sides of the U-shaped actuating lever 115 and receives a push rod 120, Fig. 3, which actuates the lever 115 causing the latter to oscillate. The push rods 120 are each connected to a cam roller 122 which are operated by cams 124—124 fixed on the shaft 20. The rods 120 and the rollers 122 are maintained in proper aligned position by means of the links 125—125 which are pivoted to the roller 122 on one end and to a bracket 126 on the other end. The bracket 126 is formed on and depends from the channel support 42.

The reservoir 45 is best shown in Figs. 7 and 8. Referring to those figures it will be seen that the reservoir comprises a cylinder 130 containing a spring pressed plunger 132 held by a guide rod 133. The cylinder has a spring housing 135 attached thereto through which the guide rod 133 passes, the guide rod extending through the end wall of the housing and forming a measurement of the amount of grease in the cylinder 130. The plunger 132 is urged inwardly by a set of compression springs 140—141, two springs being used to give a greater compression in a short distance.

The inner end of the cylinder 130 is provided with a closure head having a disc 143 with a nipple 144 mounted centrally therein and supported at its outer end by a frustro-conical plate 146 which contacts the nipple at its smaller diameter and is fixed to the disc 143 at its larger diameter. A flange 147 is formed on the members 143 and 146 to fasten the cover to the cylinder 130 through a second flange 148 and a plurality of screws 149.

Inside the cylinder on the disc 143 are mounted a plurality of triangular plates 150 seen in both Figs. 7 and 8 which form a spider to support a screen 152. The screen 152 is adapted to break up clots of grease either during filling of the cylinder 130 or during greasing operation, and insures smooth operation.

The cylinders 130 and the entire lubricating system may be filled initially by inserting a grease gun on a standard filling nipple 155 (Fig. 2).

*Operation*

Referring to Fig. 1, in operation the drum 25 may be held stationary by setting the brake 34—35. The clutch 30—31 may then be disengaged. Under this condition the shaft 20 may be rotated to drive the drum 25. Similarly the shaft 20 may be held stationary and the weight of the skip (not shown) utilized to rotate the drum 25 on the shaft. With the latter operation the brake 34 is used to control the speed of the drum. In either event, that is, when the drum 25 operates and the shaft 20 is held stationary, or, when the shaft 20 turns and the drum 25 is held stationary, it is necessary to supply lubricant to the bearings 27.

Whenever the relative motion occurs between the drum and the shaft the cams 124 operate the followers 122 (see Fig. 3) which reciprocate the rods 120 and cause the levers 115 to oscillate about the fulcrum 116 reciprocating the pistons 82—92 in the cylinders 63 and 95. When the pistons reciprocate, oil is drawn from the reservoir 45 (Fig. 3) through the cock 75, the pipes 76 (Fig. 2), the pipes 77 and 73 (Fig. 3) and into the cylinder 63, as the piston 80 travels towards the left, as seen in Fig. 5. On the stroke in the opposite direction, the piston 82 moves into the cylinder 63 closing the valve 68 and forcing the trapped grease through the passage 84 in the hollow piston 82, past the spring pressed valve 86, through the passage 87 in the hollow piston 88, and into the cylinder 95.

On the opposite stroke of the pistons more grease is drawn through the valve 68 into the cylinder 63 and simultaneously the grease which has been transferred from the cylinder 63 to the cylinder 95 on a previous stroke, is forced out of the cylinder 95, through the valve 100, and into the discharge pipe 106'.

The discharge pipes 106' from the four pumps 37 are carried in the bottom of the channel-shaped support 42 and conduct the grease to the four roller bearings 27, Figs. 2 and 4. The pumps 37, shown in Fig. 5, are arranged so that each pair of opposed cylinders have universal movement and may thus accommodate themselves automatically to the alignment of the pistons 82—88.

This construction reduces wear on the cylinders and eliminates the necessity of piston rings, packing rings, or other devices to prevent the escape of grease.

The grease may be replenished in the reservoir 45 by affixing a grease gun to the standard grease gun nipple 155 and pumping the grease past the shut-off valve 75 directly into the reservoir 45.

Grease may be forced through the pumps by shutting the cock 75 and applying an external grease gun to the fitting 155. Similarly grease may be forced to any particular bearing by shutting the cock 75 and all the cocks 157 except the one leading to the desired bearing and applying the external grease gun.

The amount of grease in the reservoir 45 is indicated visually by noting how far the piston guide rod 133 projects out of the casing 135.

It will be realized that the hereinbefore described structure is to be taken merely as a preferred form of the invention and that various changes in size, shape and arrangement of parts may be made without departing from the spirit of the invention or the scope of the subjoined claims.

That which is claimed as new and is desired to be secured by Letters Patent is:

1. In a lubricating device of the character described, a rotatable shaft, a plurality of cams on said shaft, a drum mounted on said shaft to rotate relative thereto, a plurality of bearings between said shaft and said drum, a platform supported by said drum, a lubricant reservoir mounted on said platform, a plurality of grease pumps mounted adjacent said reservoir, means to supply grease from said reservoir to said pumps, means to conduct grease from said pumps to said bearings, a cam follower actuated by each of said cams, and means operated by said cam followers to actuate said pumps.

2. In a lubricating device of the character described, a shaft adapted to be rotated, a drum mounted on said shaft, a plurality of substantially solid bearings between said shaft and said drum, a clutch mounted between said shaft and said drum to drive the drum from the shaft, a brake on said drum to control the movement of the drum independently of the rotation of the shaft, and means to lubricate the shaft when the shaft is stationary and the drum is rotated or when the shaft is rotated and the drum is stationary, including a bearing lubricator mounted on said drum and adapted to supply lubricant to said bearing and means on said shaft to actuate said bearing lubricator.

3. In a mine hoist or the like, a shaft member, a drum member mounted on said shaft and adapted to be rotated relative to said shaft, bearings between the opposite ends of said drum and said shaft, a bearing lubricator comprising a plurality of lubricant pumps carried by one of said members at a point intermediate said bearings and within said drum, each lubricant pump supplying lubricant to one of said bearings, a platform carried by the same one of said members and rotatable unitarily therewith, a lubricant reservoir of substantial capacity mounted on said platform adjacent said pumps, said reservoir having an extended arm movable axially with increases and decreases in the amount of lubricant in said reservoir, and means on the other said member to actuate said pumps to lubricate the bearings upon relative movement of the members.

4. In a mine hoist or the like, a shaft member, a drum member mounted on said shaft member and adapted to be rotated relative thereto, a plurality of spaced bearings between the drum member and the shaft member, and a bearing lubricating system comprising a plurality of lubricant pumps carried by one of said members at a point within said drum member, a support carried by one of said members and rotatable unitarily therewith, a lubricant reservoir mounted on said support adjacent said pumps, and a cam connection between said members including opposed cam elements, and actuating means for said pumps positioned for movement in response to said cam elements.

5. The structure of claim 4 characterized by and including one or more cams mounted for rotation with the shaft member, cammed members movably mounted on the drum member, and pump actuating members connected to said cammed members.

JOSEPH KELLOGG.

REFERENCES CITED

The following references are of record in the file of this patent:

UNITED STATES PATENTS

| Number | Name | Date |
|---|---|---|
| 228,137 | Stauffer | May 25, 1880 |
| 743,577 | Shoosmith | Nov. 10, 1903 |
| 810,194 | Dietz | Jan. 16, 1906 |
| 1,370,422 | Funk | Mar. 1, 1921 |
| 1,752,333 | Clark | Apr. 1, 1930 |

FOREIGN PATENTS

| Number | Country | Date |
|---|---|---|
| 4,478 | Great Britain | 1910 |